No. 843,807. PATENTED FEB. 12, 1907.
B. GRUBBS.
SEATING STRIP FOR RAIL JOINTS.
APPLICATION FILED NOV. 10, 1904.
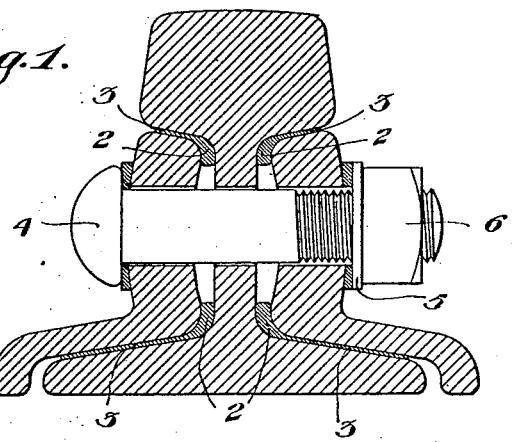
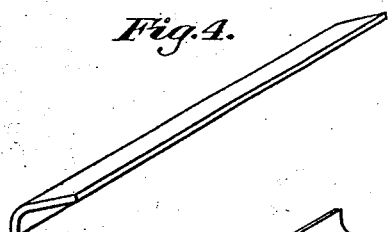
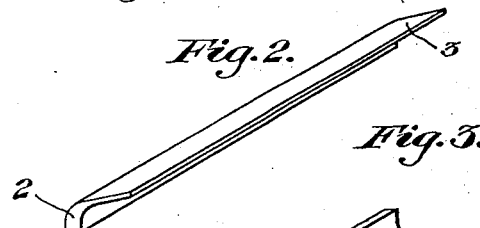
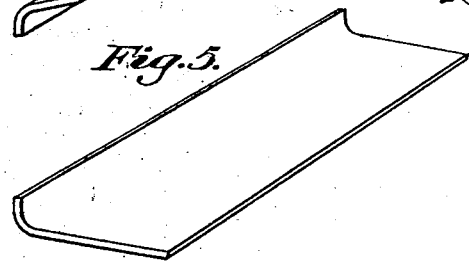
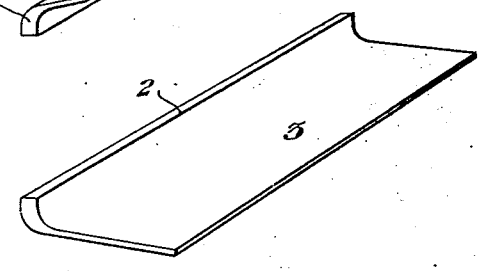
Witnesses: Inventor:

UNITED STATES PATENT OFFICE.

BARTON GRUBBS, OF ALLEGHENY, PENNSYLVANIA.

SEATING-STRIP FOR RAIL-JOINTS.

No. 843,807.  Specification of Letters Patent.  Patented Feb. 12, 1907.

Application filed November 10, 1904. Serial No. 232,066.

*To all whom it may concern:*

Be it known that I, BARTON GRUBBS, a citizen of the United States, residing at Allegheny, in the county of Allegheny and State of Pennsylvania, have invented certain new and useful Improvements in Seating-Strips for Rail-Joints, of which the following is a specification, reference being had therein to the accompanying drawings, forming part of the specification, in which—

Figure 1 is a cross-section through a rail-joint, showing my improved seating device incorporated between the bearing portions of the fish-plates and the head and flanges of the rail, respectively, and also between the head of the bolt and the nut-locking washer at each side and the fish-plates. Figs. 2 to 6, inclusive, are detail views of various forms of the invention as made ready for use.

My invention refers to improvements in means for providing a tight solid bearing between the meeting elements of any connected devices with particular reference to the application thereof to the fish-plates and meeting ends of the rails in making a rail-joint. Ordinarily in joining these members together considerable difficulty is experienced in making a tight joint by reason of inequalities in the meeting faces due to scale, pitting, rust, or any other causes which frequently occur in this class of apparatus, especially where exposed to the elements. By reason of such inequalities it is impossible to screw the bolts up so tight that they will not eventually become more or less loose due to deterioration of the metal or the intervening scale under the incessant severe shocks to which the rails are subjected in use, and as it is practically impossible to economically finish the meeting faces to make an absolutely tight fit so as to obviate the necessity of further adjustment it becomes necessary from time to time to take up the space or looseness by tightening the nuts, and such loosening is also a source of serious trouble by reason of the lessening of the resisting pressure of the fish-plates. A further source of trouble is the constant knocking and noise incident to the constant use and wear.

My invention is designed to obviate these difficulties, and consists in providing strips of cushioning substance or material 2 of comparatively hard substance having sufficient compressibility to permit of its partial compression under the action of the bolts and also to allow of its being forced into the inequalities of the metal at both sides, so as to become completely embedded therewith. All possible space is thus taken up, so that when compressed to its practical limit of reduction the filler-strips constitute practically continuous portions of the rail and fish-plates in the same manner as though the metals were fused together. When thus incorporated and the nuts and bolts are drawn up tight and secured with the proper locking devices, the rail-joint is practically solid throughout as to its meeting portions and incapable of any further deterioration due to the causes specified, thereby rendering it continuously effective to the highest possible extent and obviating the necessity of any further adjustment or tightening of the bolts due to these causes.

In the forms of the invention illustrated in Figs. 1, 2, and 3 the strip is shown of a thickness of, say, one-eighth of an inch at the meeting angles formed between the web of the rail and the head and flanges, respectively, being the points of most direct inward bearing of the fish-plates. If desired, the strips may merely consist of narrow pieces, such as shown in Fig. 6, so as to provide a bearing at these joints only; but I preferably make them with an extended web portion 3, which may be comparatively thinner and adapted to interfit between the upper and lower faces of the fish-plate and the under and upper parts of the flange, respectively, as clearly shown in Fig. 3. By this construction a continuous flat bearing is provided throughout the full width of these meeting faces, and the efficiency of the joint is increased, while resulting in practically complete protection for all of the interior portions from the corrosive effect of the elements.

If desired, the strips may be made in the forms shown in Figs. 4 and 5 of the same general thickness throughout, curved to correspond to the meeting faces, and good results may be secured from this form while permitting of a somewhat closer adjustment of the parts. The same material, molded or suitably shaped into adaptable forms, is also applied underneath the heads of the bolts 4 and the locking-washers 5 or underneath the nuts 6 themselves, bearing against the faces of the fish-plates, acting in the same manner as already described and insuring an absolutely tight contact.

I do not desire to be limited to any specific material or substance, as various materials may be employed having the desirable qualities of hardness and a limited compressibility together with the requisite strength. Good results may be secured with a combination of canvas belting and a suitable body of material with which the belting may be combined, as asphaltum, which when compressed to its limit will conform to the meeting faces and seat, becoming absolutely solid. Vegetable fiber, as wood-pulp, is also well adapted to the purpose.

The material employed is preferably of a character adapted to form a good electrical conductor for the purpose of also acting as current-carrying means for the usual signal-currents transmitted through the rails, and for this reason I desire to avoid the use of fiber or any material of a non-conducting nature.

I am aware that non-conducting fiber has been used between the fish-plates and the rails, formed to fit thereto and between these parts; but such material is not compressible in its nature and is not adapted to the objects of my invention, but, on the contrary, is an actual detriment in so far as securing the results which I have in view.

I do not desire to be limited to the exact shape or formation of the invention as shown and described, as it is obvious that it may, if desired, be laid clear across the entire inner covered area of rail web, flanges, and head, holes for the bolts being provided; but for the purposes of the present invention the upper and lower seating-strips entirely fulfil the objects in view.

Having described my invention, what I claim is—

The combination with the meeting ends of rails and the connecting fish-plates therefor, of seating-strips of hard compressible material as fiber having thin web portions adapted to interfit between the adjacent sloping faces of the rail flange and head and the lower and upper faces of the fish-plate respectively and having abruptly-turned space-filling flanges extending upwardly and downwardly between the web of the rail and the fish-plates above and below the securing-bolts, substantially as set forth.

In testimony whereof I affix my signature in presence of two witnesses.

BARTON GRUBBS.

Witnesses:
JAS. J. MCAFEE,
MILTON BARTLEY.